US006924838B1

(12) United States Patent
    Nieves

(10) Patent No.: US 6,924,838 B1
(45) Date of Patent: Aug. 2, 2005

(54) GRENADE CAM

(76) Inventor: Charlton Nieves, 105-72 Flatlands 1st St., Brooklyn, NY (US) 11236

( * ) Notice: Subject to any disclaimer, the term of this patent is extended or adjusted under 35 U.S.C. 154(b) by 1014 days.

(21) Appl. No.: 09/629,986

(22) Filed: Jul. 31, 2000

(51) Int. Cl.[7] .................. H04N 5/232; H04N 9/47; H04N 5/225; H04B 1/034
(52) U.S. Cl. .............. 348/211.99; 348/143; 348/373; 455/98
(58) Field of Search ................. 348/211, 143–159, 348/117–118, 123, 83–85, 373; 455/98; 244/190, 244/3.11

(56) References Cited

U.S. PATENT DOCUMENTS

| | | | | |
|---|---|---|---|---|
| 3,962,537 | A | * | 6/1976 | Kearns et al. ............... 348/144 |
| 4,643,616 | A | * | 2/1987 | Castel et al. ................ 405/191 |
| 4,655,567 | A | | 4/1987 | Morley |
| 4,687,170 | A | | 8/1987 | Beaver |
| 4,728,839 | A | | 3/1988 | Coughlan et al. |
| 4,749,198 | A | * | 6/1988 | Brailean ....................... 455/98 |
| 4,855,838 | A | * | 8/1989 | Jones et al. ................. 348/373 |
| 5,054,725 | A | * | 10/1991 | Bucefari et al. ........ 248/123.11 |
| 5,093,679 | A | | 3/1992 | Taniguchi et al. |
| 5,147,002 | A | * | 9/1992 | Hughes .................... 348/211.4 |
| 5,382,943 | A | | 1/1995 | Tanaka |
| 5,463,432 | A | | 10/1995 | Kahn |
| 5,555,019 | A | * | 9/1996 | Dole ........................ 348/211.2 |
| 5,650,821 | A | * | 7/1997 | Hewlett ....................... 348/373 |
| 5,711,227 | A | * | 1/1998 | Johnson ...................... 104/126 |
| 5,835,806 | A | * | 11/1998 | Kautz ............................ 348/83 |
| 5,956,135 | A | * | 9/1999 | Quesnel ......................... 348/84 |
| 5,984,353 | A | | 11/1999 | Rasmussen |
| 5,992,247 | A | * | 11/1999 | Manestar ....................... 348/84 |
| 6,034,716 | A | | 3/2000 | Whiting et al. |
| 6,034,722 | A | | 3/2000 | Viney et al. |
| 6,119,976 | A | * | 9/2000 | Rogers ........................ 244/13 |
| 6,142,410 | A | * | 11/2000 | Naccache .................. 244/3.11 |
| 6,667,771 | B1 | * | 12/2003 | Kweon ....................... 348/373 |

* cited by examiner

Primary Examiner—Thai Tran
Assistant Examiner—Nhan Tran
(74) Attorney, Agent, or Firm—Michael I. Kroll

(57) ABSTRACT

A grenade cam is provided and is designed as a surveillance camera projectile. It is manually thrown or propelled by means of a grenade launcher into a visually restricted area or location of surveillance. Once the grenade cam lands in the desired position, four legs automatically spring open and stand the primary housing portion upright. This is achieved by a leg release motor assisted by spring and worm-drive devices. This occurs in unison with the deployment of the camera through the top end of the primary housing. The grenade cam then transmits a video signal along with an audio signal to a remote portable receiver monitored by the user. The internal components include of a camera housing, a 360 degree rotation motor, a camera tilt motor, leg release pins, a circuit board, a spring, a worm drive guide, video/audio receiver and transmitter, battery, timer and leg release motor. The camera housing can be fully or partially transparent for the camera view. In another embodiment the primary housing is fully or partially transparent with a stationary camera. The receiver is a portable unit consisting of a carrying case containing a monitor, speaker and control panel. The control panels function is to operate the camera rotation, tilt, monitoring surveillance and sound. It is a portable device and may be moved to different locations within reasonable range.

32 Claims, 14 Drawing Sheets

GRENADE CAM

BACKGROUND OF THE INVENTION

1. Field of the Invention

The present invention relates generally to cameras and, more specifically, to observation cameras. he grenade cam is designed as a surveillance camera projectile. It is manually thrown or propelled by means of a grenade launcher into a visually restricted area or location of surveillance. Once the grenade cam lands in the desired position, four legs automatically spring open and stand the housing portion upright. This is achieved by a leg release motor assisted by spring and worm drive devices. This occurs in unison with the deployment of the camera. The grenade cam then transmits a video signal along with an audio signal to a remote portable receiver monitored by the user. The grenade cam is designed to be used by military and law enforcement personal as a reconnaissance device. The external housing structure is constructed of ABS or steel. The internal components include of a camera housing, a 360 degree rotation motor, a camera tilt motor, leg release pins, a circuit board, a spring, a worm drive guide, video/audio receiver and transmitter, battery, timer, and leg release motor. The receiver is a portable unit consisting of a carrying case containing a monitor, speaker and control panel. The control panels function is to operate the camera rotation, tilt, monitoring surveillance and sound. It is a portable device and may be moved to different locations within reasonable range.

2. Description of the Prior Art

There are other camera device designed for surveillance. Typical of these is U.S. Pat. No. 4,655,567 issued to John D. Morly on Apr. 7, 1987.

Another patent was issued to Joel B. Coughlan et al. on Mar. 1, 1988 as U.S. Pat. No. 4,728,839. Yet another U.S. Pat. No. 4,687,170 was issued to Richard C. Beaver on Aug. 18, 1987 and still yet another was issued on Mar. 3, 1992 to Taniguchi as U.S. Pat. No. 5,093,679.

Another patent was issued to Mutuo Tanaka on Jan. 17, 1995 as U.S. Pat. No. 5,382,943. Yet another U.S. Pat. No. 5,463,432 was issued to Philip Kahn on 5,463,432. Another was issued to James L. Kautz on Nov. 10, 1998 as U.S. Pat. No. Des. 5,835,806.

U.S. Pat. No. 6,034,722

Inventor: Ian T. Viney

Issued: Mar. 7, 2000

A method and apparatus are provided for performing remote control and viewing with a total station. The total station is operated remotely from a remote control and viewing unit (RCVU) by a single user. The total station has a measurement unit, a video camera aligned with the measurement unit for acquiring real-time images of a target, and a transceiver for transmitting video images to the RCVU and for receiving control data from the RCVU. The RCVU includes a transceiver for transmitting the control data to the total station and for receiving the video images for the total station. The RCVU also includes a display device for displaying real-time video images from the camera and includes controls for allowing the user to remotely align the total station with the target using the display video images. A fine-tuning focus control on the RCVU allows the user to remotely focus the camera. The RCVU also includes an alphanumeric input device for allowing the user to enter text, which can be stored locally in the RCVU or in the total station in association with acquired measurements and image data.

U.S. Pat. No. 5,835,806

Inventor: James L. Kautz

Issued: Nov. 10, 1998

A self-contained camera enclosure provides protection from intermittent exposure to high temperatures and fire. The protection is provided without connection to electricity or water, and is practical for use in remote areas. Protection is provided by a heat-reflecting outer box containing a liner of insulating material and a frozen-liquid cooling system. A double-pane window visible light to enter the enclosed camera while simultaneously blocking heat transmission. To accommodate remote camera equipment, a four-ply thermal insulation is used to protect the cable extending from the enclosure. The enclosure can accommodate different models and types of camera equipment.

U.S. Pat. No. 5,463,432

Inventor: Philip Kahn

Issued: Oct. 31, 1995

The invention is directed to a computer-controlled miniature pan/tilt tracking mount for the control of position, velocity, and acceleration of small payloads (e.g., a video camera). The invention consists of a motorized rotational tilt axis mounted atop a motorized rotational pan axis. For both axes, a worm gear mounted upon the motor shaft bidirectionally rotates a worm wheel mounted upon the orthogonal load axis shaft. A large ratio of motor size to armature weight provides high relative torque, speed, and accuracy. The worm gears provide compact reduction with minimal backlash and they can hold position without energized motors to conserve power for battery-operated uses. The invention includes integrated motor drive power electronics and micro controller execution of host computer commands to effect precise control of pan/tilt mount speed, acceleration, position, configuration, and motor and electronics power consumption. Superior motor drive capabilities are achieved by the use of pulse-width modulation (PWM).

U.S. Pat. No. 5,382,943

Inventor: Mutuo Tanaka

Issued: Jan. 17, 1995

A remote monitoring apparatus includes a camera for producing a video signal from a picture of a remote site location being monitored, an image processor for outputting an image signal through an image processing process for the video signal, a microphone for producing a sound signal from a sound at the location, a temperature sensor for outputting a detection signal when a temperature change higher than a predetermined level is detected at the location, a gas sensor for outputting a detection signal when a concentration of oxygen gas smaller than a predetermined first level or a concentration of hydrogen gas greater than a predetermined second level is detected in the location, a converter for outputting digital signals by converting the image signal, the sound signal and the detection signal, and a radio transmitter for transmitting the digital signals of the converter to a radio receiver of a control equipment via radio transmission. In apparatus, the camera, the image processor, the microphone, the temperature sensor. The gas sensor, the converter, and the radio transmitter are built in an enclosure case and the security of the remote site location is monitored from a central control equipment by using the remote monitoring unit placed at the remote site location.

U.S. Pat. No. 5,093,679

Issued: Mar. 3, 1992

Inventor: Taniguchi

This invention discloses a camera capable of being remote-controlled by a remote signal, comprising a memory for storing a distance information in response to the operation of an operating member, and a control circuit for permitting the memory to hold the distance information stored in the memory in response to the setting to enable remote control by the remote control signal even after the operation of the operating member was canceled.

U.S. Pat. No. 4,687,170

Inventor: Richard C. Beaver

Issued: Aug. 18, 1987

A mount for surveillance camera or the like for moving the camera between an operating position and a servicing position for changing film or lens or the like. The camera and the mount have interengaging support means and a fastener for joining the support means together for supporting the camera. A shaft is positioned in a mounting bracket, with the shaft having threaded sections projecting upwardly and downwardly from the mounting bracket. The support means is fastened to the upper end of the shaft with a detent member carried on the shaft for engaging a detent member in the bracket, with the shaft detent member being adjustable with respect to the camera position. The shaft is clamped to the bracket by a nut or the like on the downwardly extending section. With the detents engaged, the camera is initially adjusted to the desired operating position and then the support means is clamped at the upper end of the shaft. When it is desired to move the camera for servicing, the clamp at the lower end of the shaft is loosened, the camera and shaft rotated with respect to the bracket to any location, and after servicing, the camera is again rotated to engage the detent, and the shaft is clamped in position.

U.S. Pat. No. 4,728,839

Inventor: Joel B. Coughlan, et al.

Issued: Mar. 1, 1988

A motorized pan/tilt head and support member for mounting a video camera or the like. A pan/tilt head is mounted upon a first end of the support member. This head is substantially U-shaped, with a bottom cross member and parallel legs at opposite ends of the cross member. The video camera or the like is pivotally suspended between the two legs. Electric motors housed within the cross member and legs, provide panning and tilting motion through the use of gear mechanisms attached to the motors. In order to provide closed loop control, position sensing devices are driven by each of the motors to provide an output signal related to position. The electrical wires of the components pass along the central axis of the support member and terminate at an electrical plug at the second end thereof. This plug mates with a second portion affixed to a surface to which the support member is to be releasably attached. The entire unit is made to be liquid proof, and all components are remotely replaceable. In preferred embodiments, high intensity lights are moved in unison with the video camera. In one embodiment a "crash plate" with limit switches are provided to stop motion of the pan/tilt head if an object is encountered. The unit is principally for use in hazardous areas such as those where radioactivity is present.

U.S. Pat. No. 6,034,716

Inventor: Joshua B. Whiting

Issued: Mar. 7, 2000

Method and apparatus for recording images at a scene in a panoramic manner enabling subsequent reproduction at remote display devices, and particularly enabling selection of a particular viewing angle at each display device without interfering with selection of viewing angles at other display devices. A stationary camera is operated at the scene being recorded, with a rapidly rotating mirror directing optical images successively from a three hundred sixty degree pattern about the axis of the lens of the stationary camera. Rotational speed is selected such that images are captured at frequencies assuring that reproduction of the images will yield continuous, smooth moving images from one selected viewing angle. The optical images are directed into the camera and then rendered into digital form and entered into memory. Shutter speed or rate and timing of data conversion or entry into memory is controlled to assure capture of optical images repeatedly from several predetermined different viewing angles, as recorded at the camera. Data entered into memory is subsequently transmitted for reproduction at a plurality of remotely located display devices such as CRTs. The operator of each CRT can control his or her CRT to display aspects of images, such as selecting one of the viewing angles, zooming, and changing viewing angles, independently of images displayed at other CRTs.

While these surveillance cameras may be suitable for the purposes for which they were designed, they would not be as suitable for the purposes of the present invention, as hereinafter described. It is thus desirable to provide a surveillance camera which may be thrown by the user into a visually restricted area and self deploy, sending to a receiver device visual and audio signals. It is further desirable to provide said device with a tough and durable housing constructed of ABS or steel.

SUMMARY OF THE PRESENT INVENTION

A primary object of the present invention is to provide a device wherein reconnaissance may be achieved at close range while user is located in a safe area.

Another object of the present invention is to provide a device wherein reconnaissance may be achieved by manually throwing or launching a self deploying camera into a desired location of surveillance.

Yet another object of the present invention is to provide a device wherein a camera may be manually thrown or launched to desired location of surveillance and automatically deploy stand in an upright position.

Yet another object of the present invention is to provide a device that deploys a camera that transmits visual and audio signals to a receiver.

The present invention overcomes the shortcomings of the prior art by providing a device in which reconnaissance may be achieved at close range while user is located in a safe area.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is a pictorial view depicting a reconnaissance team preparing to manually deploy the grenade cam of the present invention. Shown are enemy tanks traversing a visually restricted area. The soldier standing is preparing to deploy the grenade cam as the other soldier works the monitor. The grenade cam system may be operated by a single person as well.

FIG. 2 is a pictorial view depicting a reconnaissance team preparing to manually deploy the grenade cam of the present invention. The soldier standing is preparing to deploy the grenade cam as the other soldier works the monitor. The grenade cam system may be operated by a single person as well.

FIG. 3 is a pictorial illustration depicting a hostage or hold up situation in which the grenade cam may be deployed. The device of the present invention may be manually deployed into a visually restricted area for surveillance.

FIG. 4 is a pictorial view depicting a reconnaissance team preparing to launch the grenade cam of the present invention. Shown are enemy tanks traversing a visually restricted area. The soldier standing is preparing to deploy the grenade cam by means of a grenade launcher as the other soldier works the monitor. The grenade cam system may be operated by a single person as well.

Figure 1:
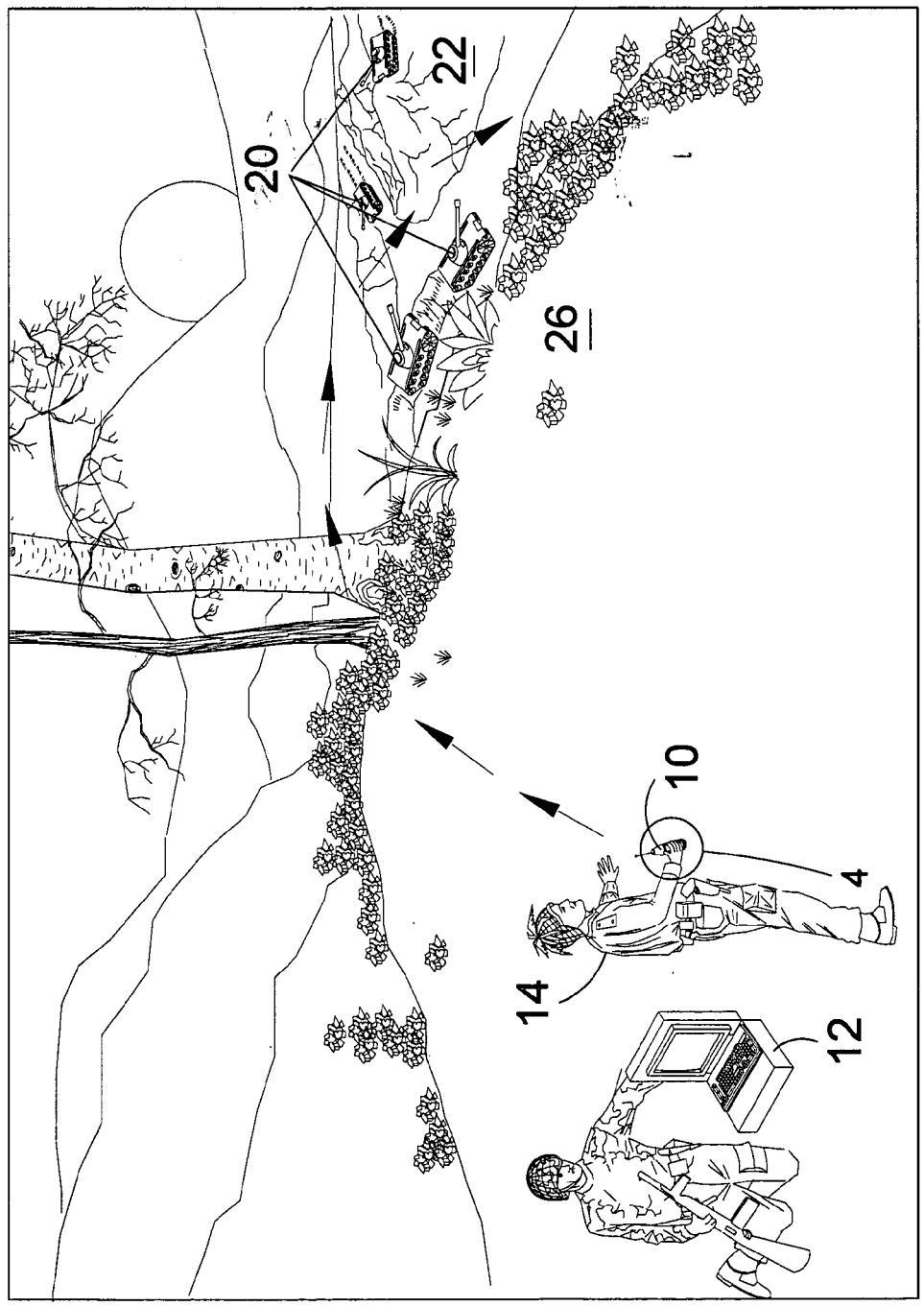
Figure 2:
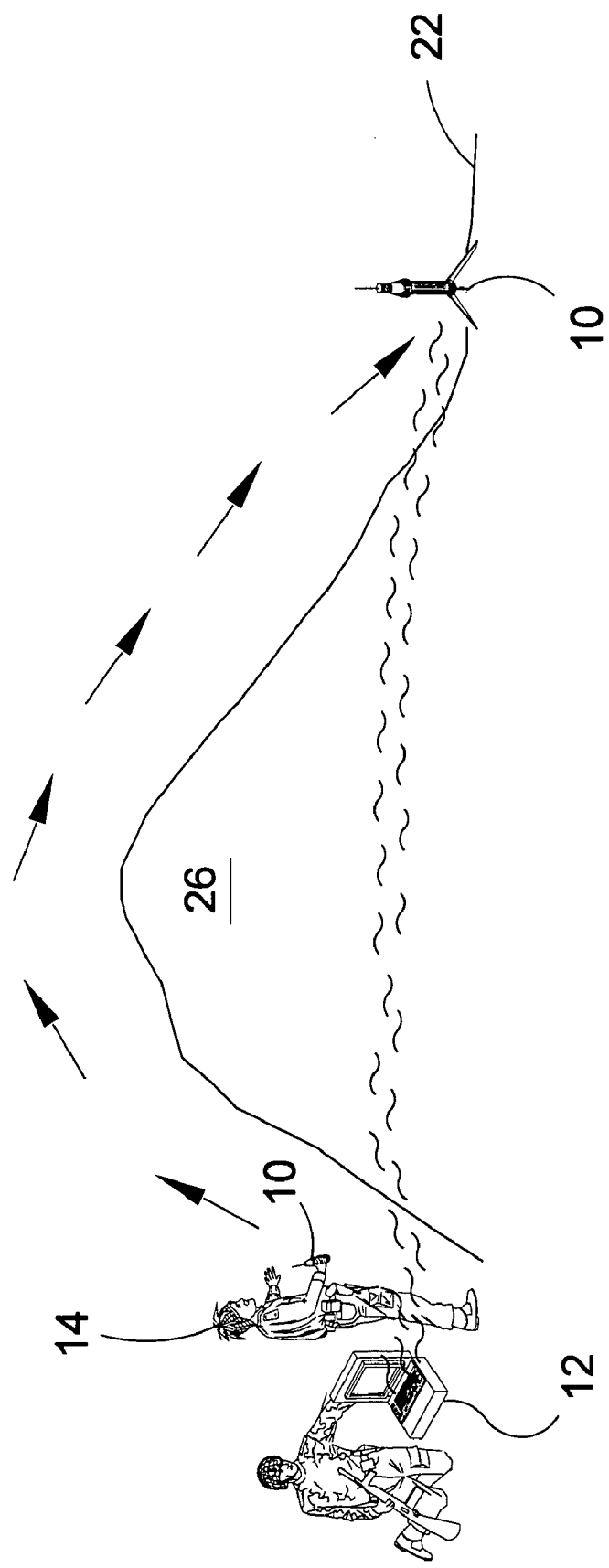
Figure 3:
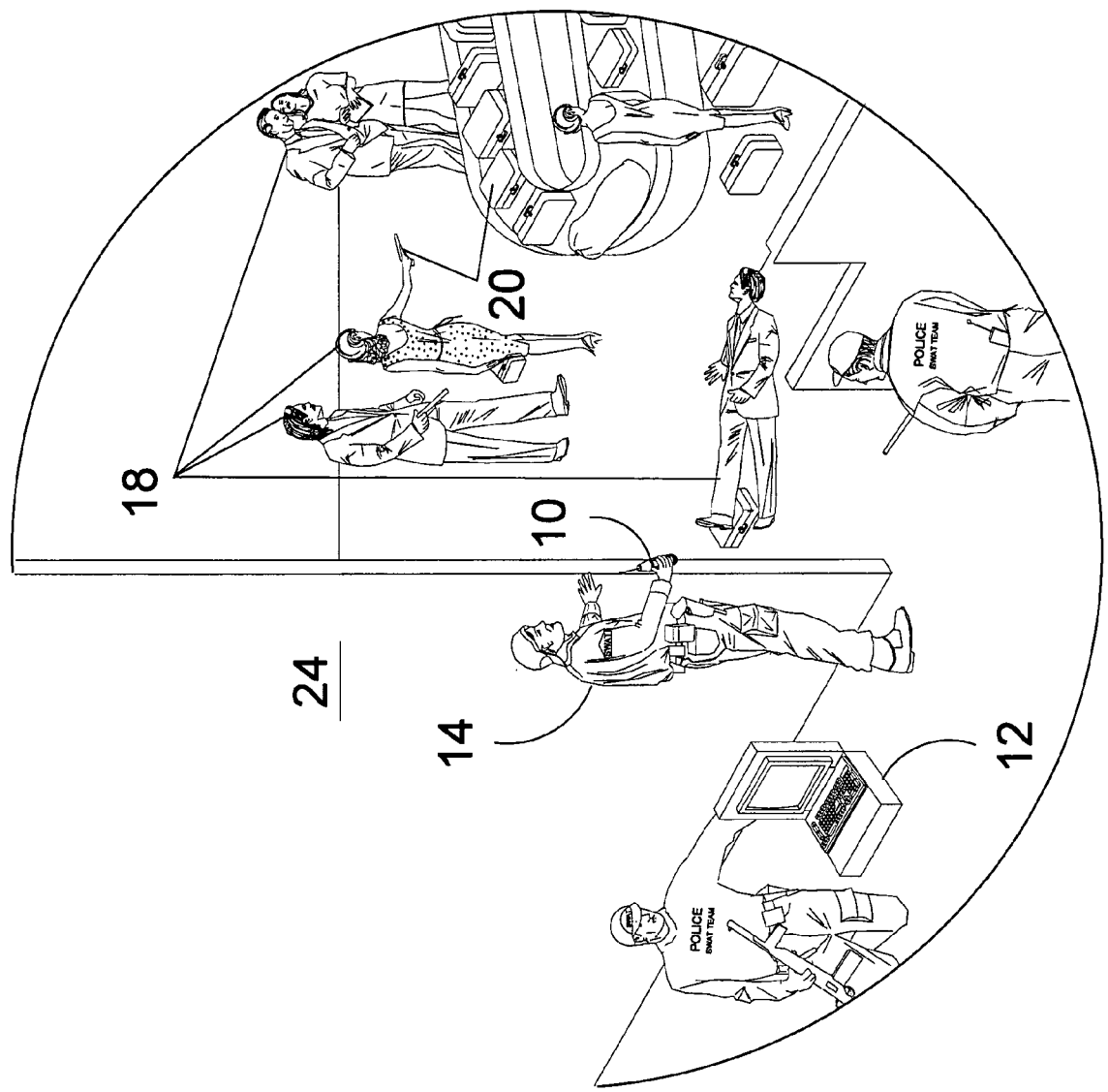
Figure 4:
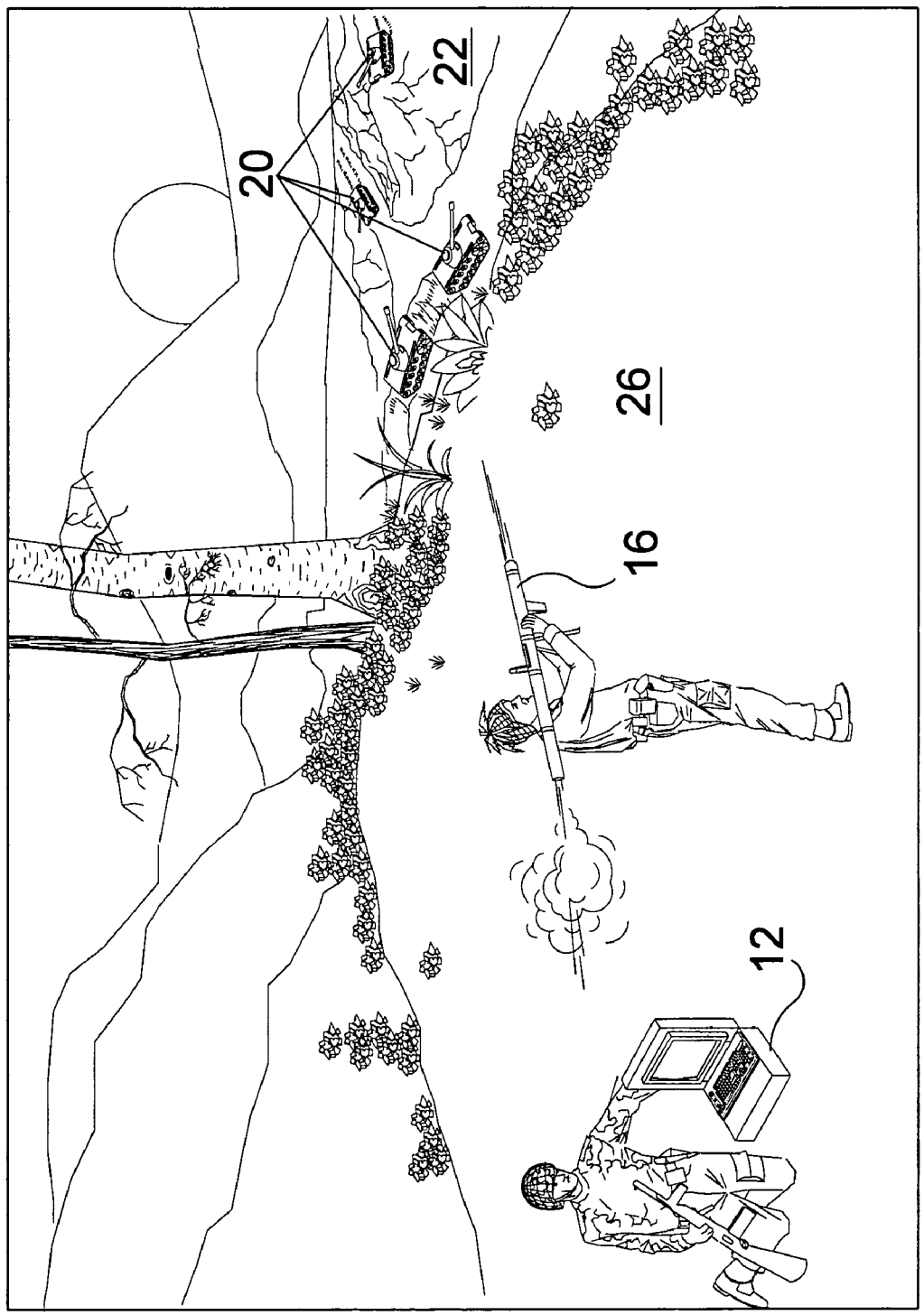
Figure 5:
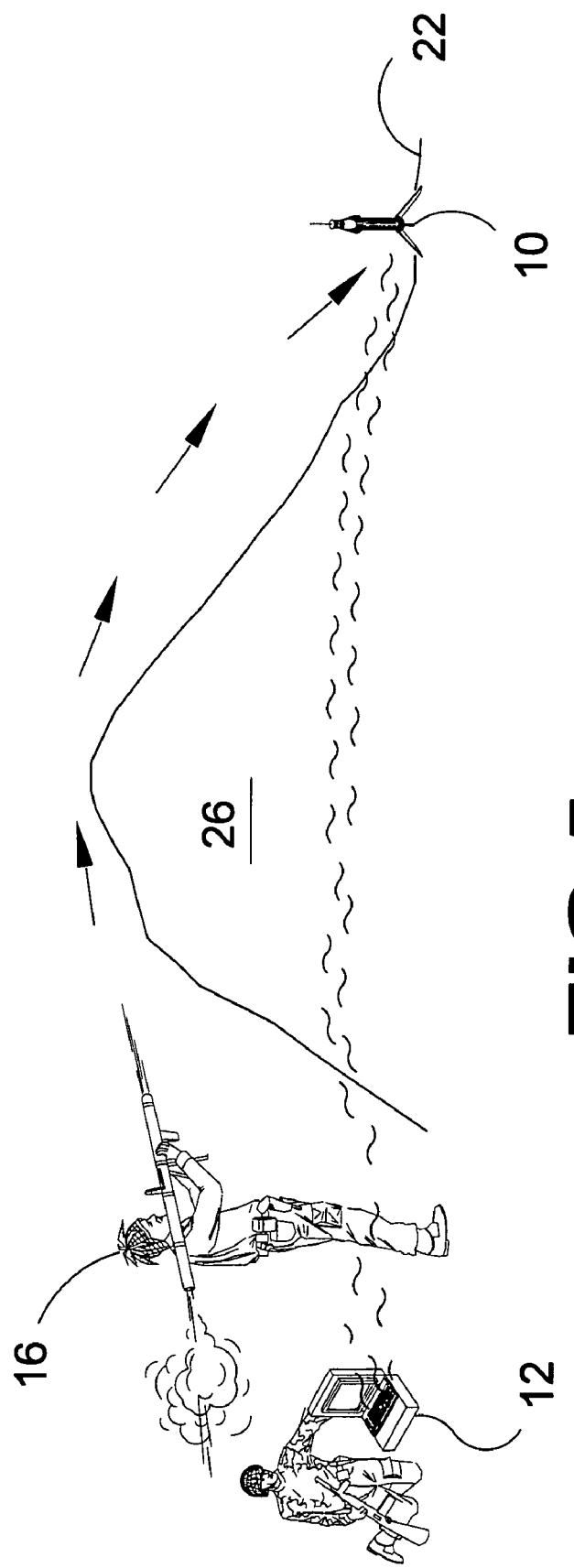
FIG. 5 is a pictorial view depicting a reconnaissance team preparing to launch the grenade cam into an area of restricted view. When the grenade cam is in position, it will begin to transmit signals to the receiver.
Figure 6:
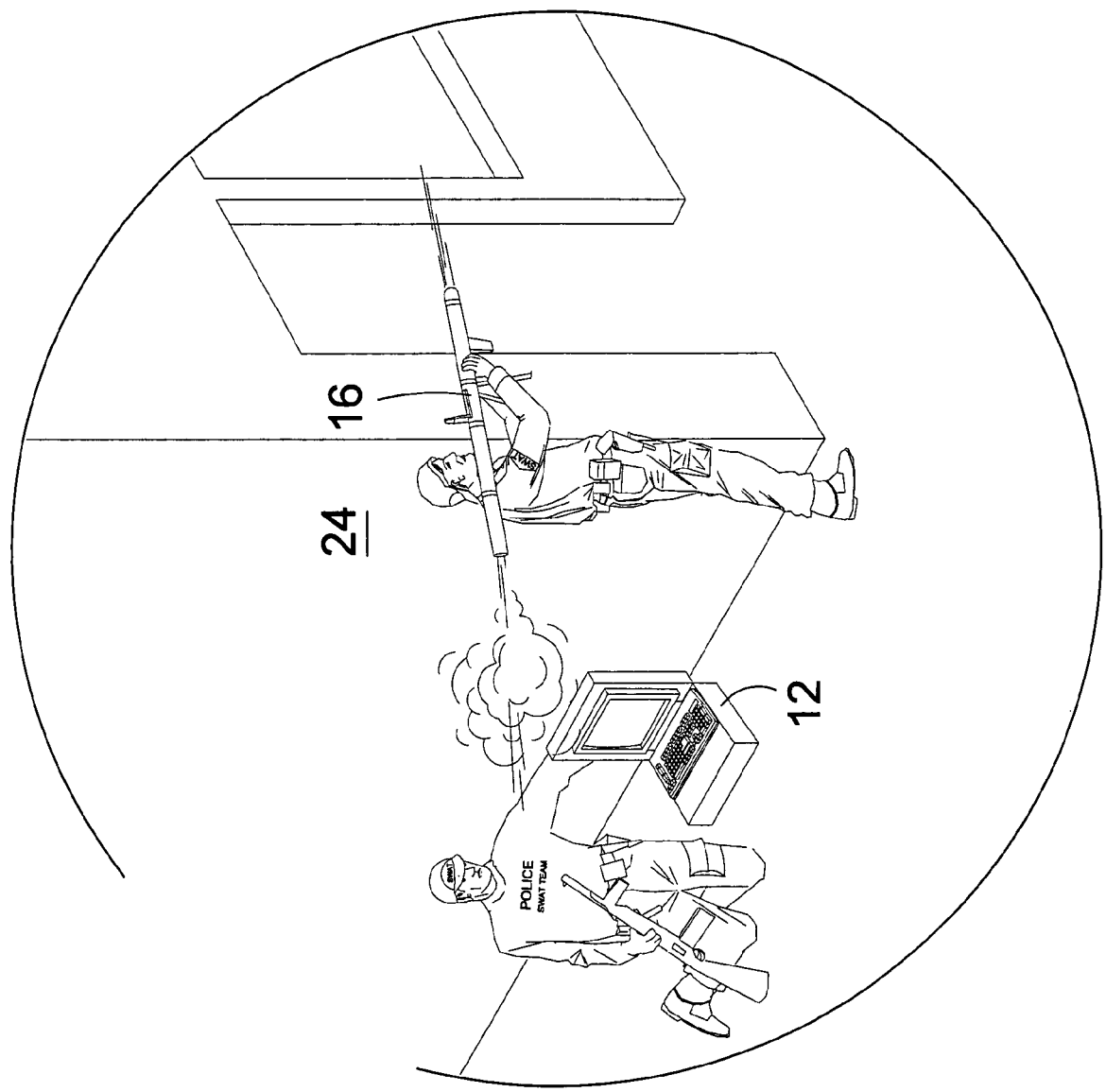
FIG. 6 is a pictorial illustration depicting a situation in which the grenade cam may be deployed by means of a grenade launcher. The device of the present invention is deployed into a visually restricted area for surveillance.
Figure 7:
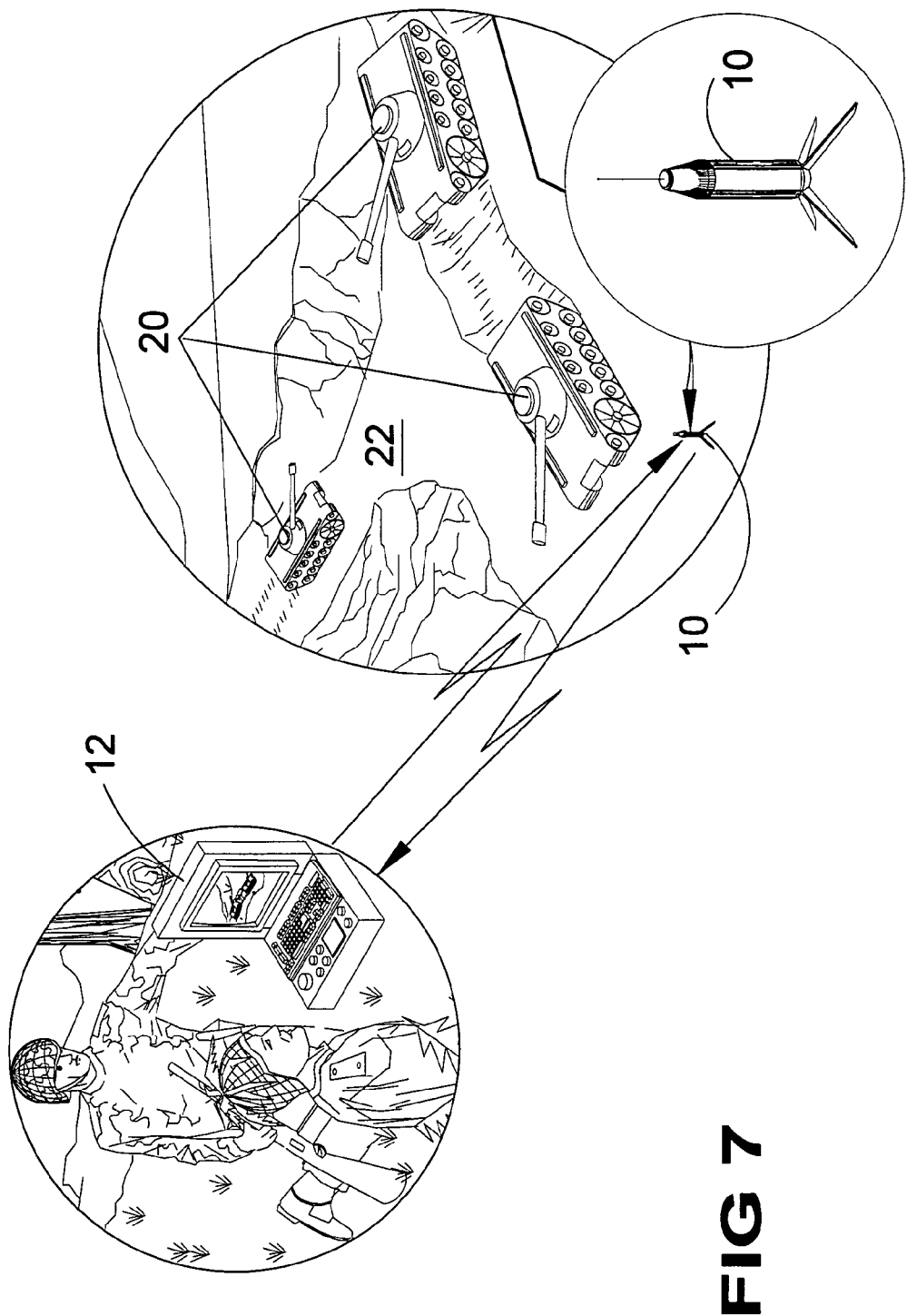

FIG. 7 is a pictorial view of the grenade cam deployed and in position. The camera is activated and transmitting an image and audio signal. The signal is sent to the receiver device and viewed by the operator.

Figure 8:
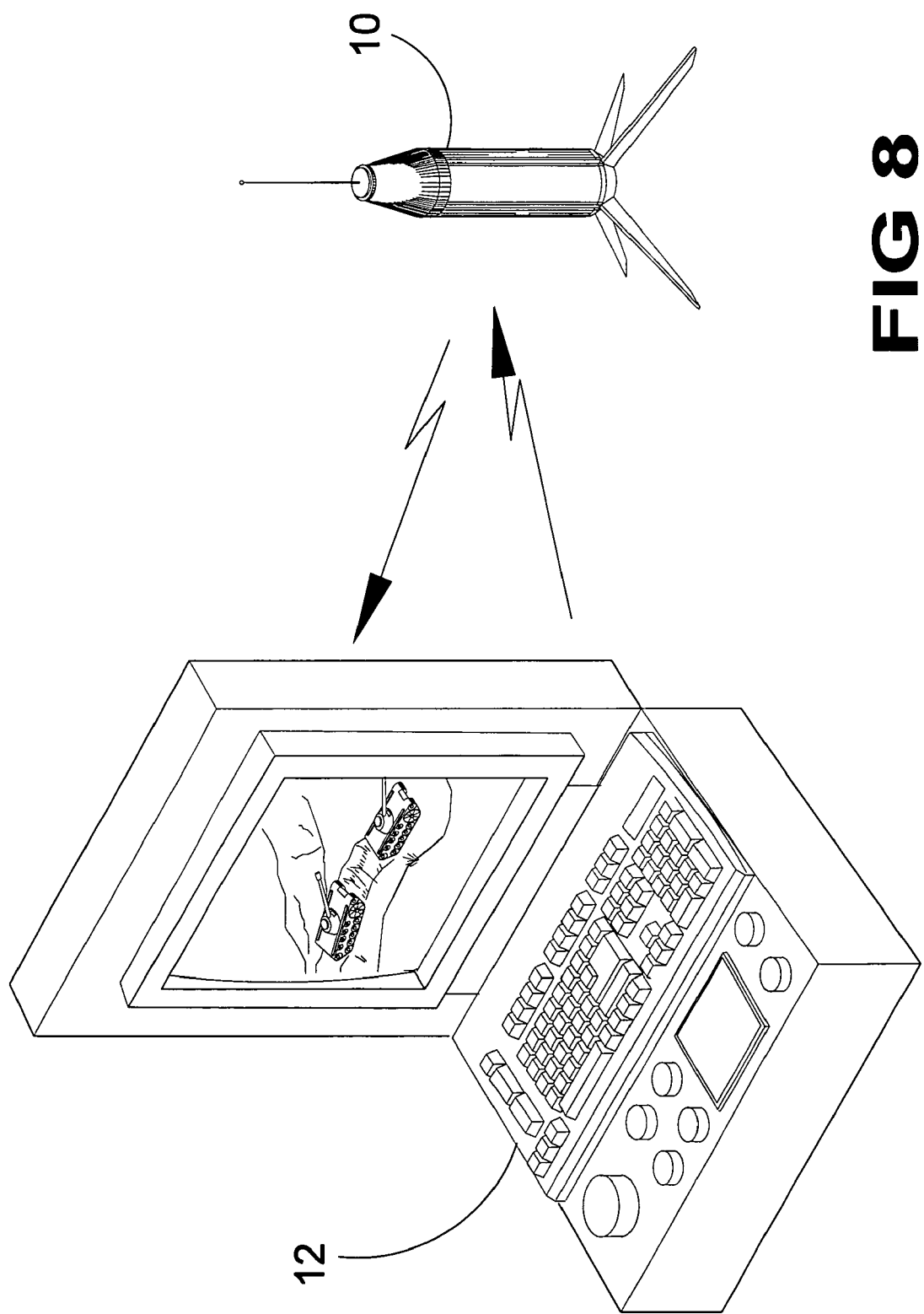

FIG. 8 is a perspective illustration depicting the grenade cam and the receiving device. The cam sends a signal to the receiver in which is visually displayed. The audio signal is also received simultaneously.

Figure 9:
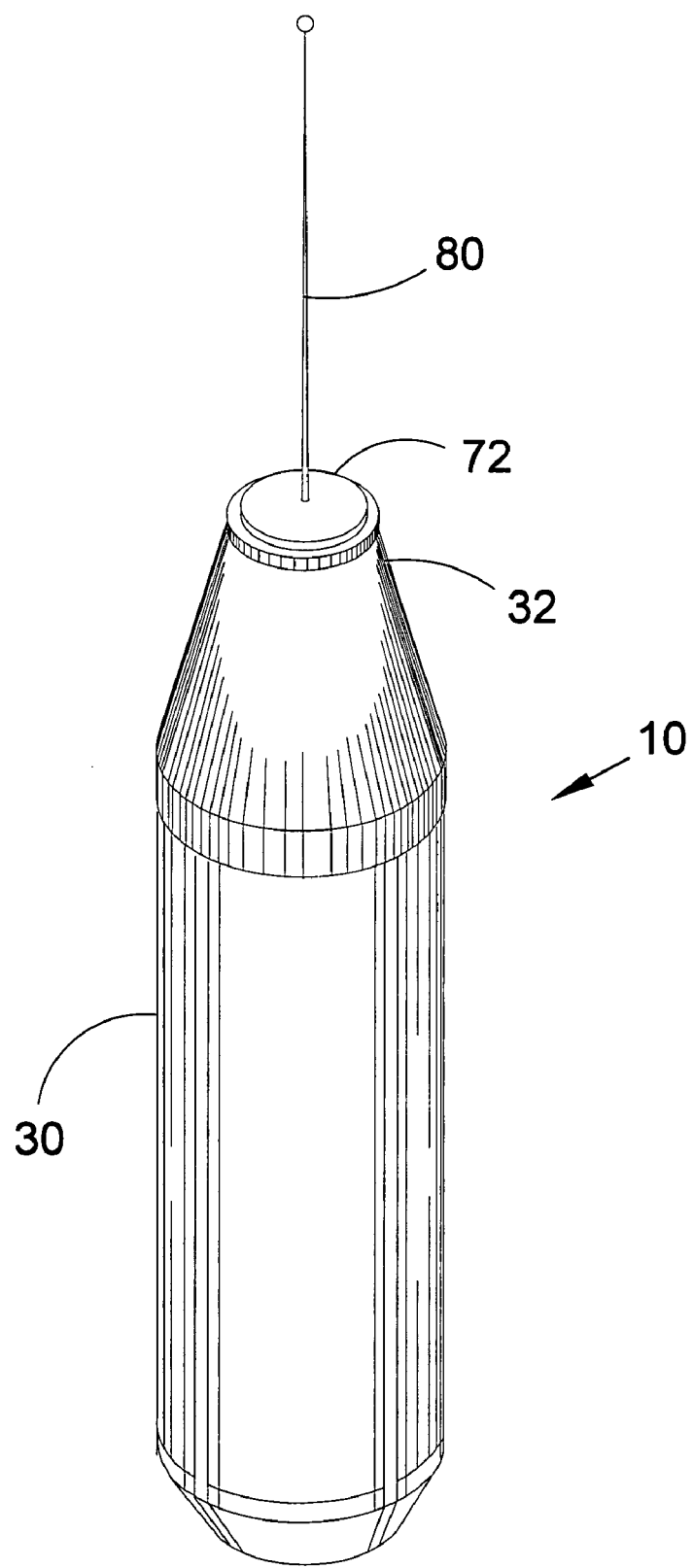

FIG. 9 is a perspective view of the present invention shown in an inactivated state. The four legs are in the stow position and the camera is retracted within the housing unit.

Figure 10:
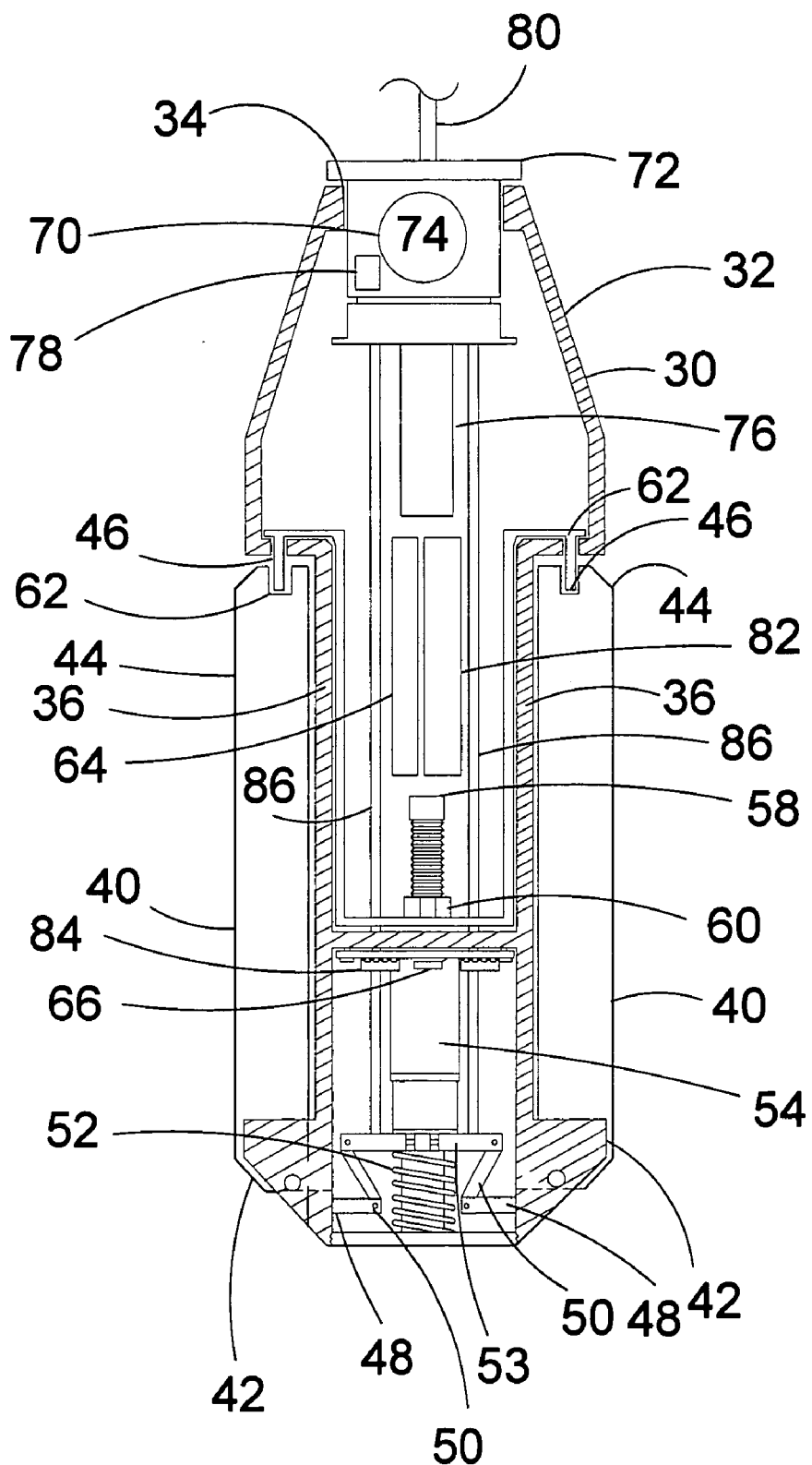

FIG. 10 is a sectional view of the present invention showing the internal components in an inactivated state. The four legs are in the stow position and the camera is retracted into the housing of the unit.

Figure 11:
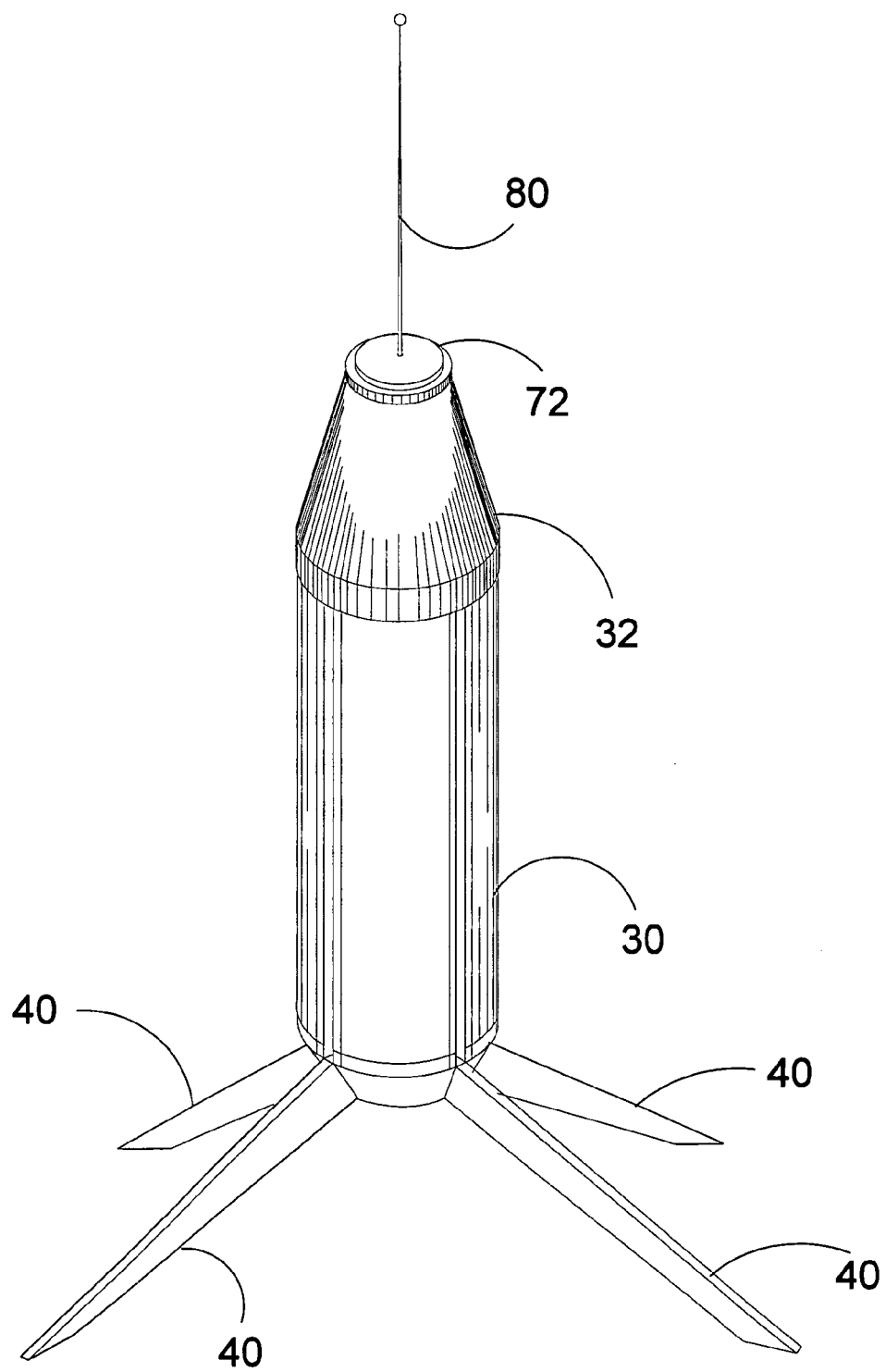

FIG. 11 is a perspective view of the present invention in a deployed state. The four legs are in the open position, the housing standing upright and the camera deployed. The grenade cam is now activated and ready to send signals to the receiver.

Figure 12:
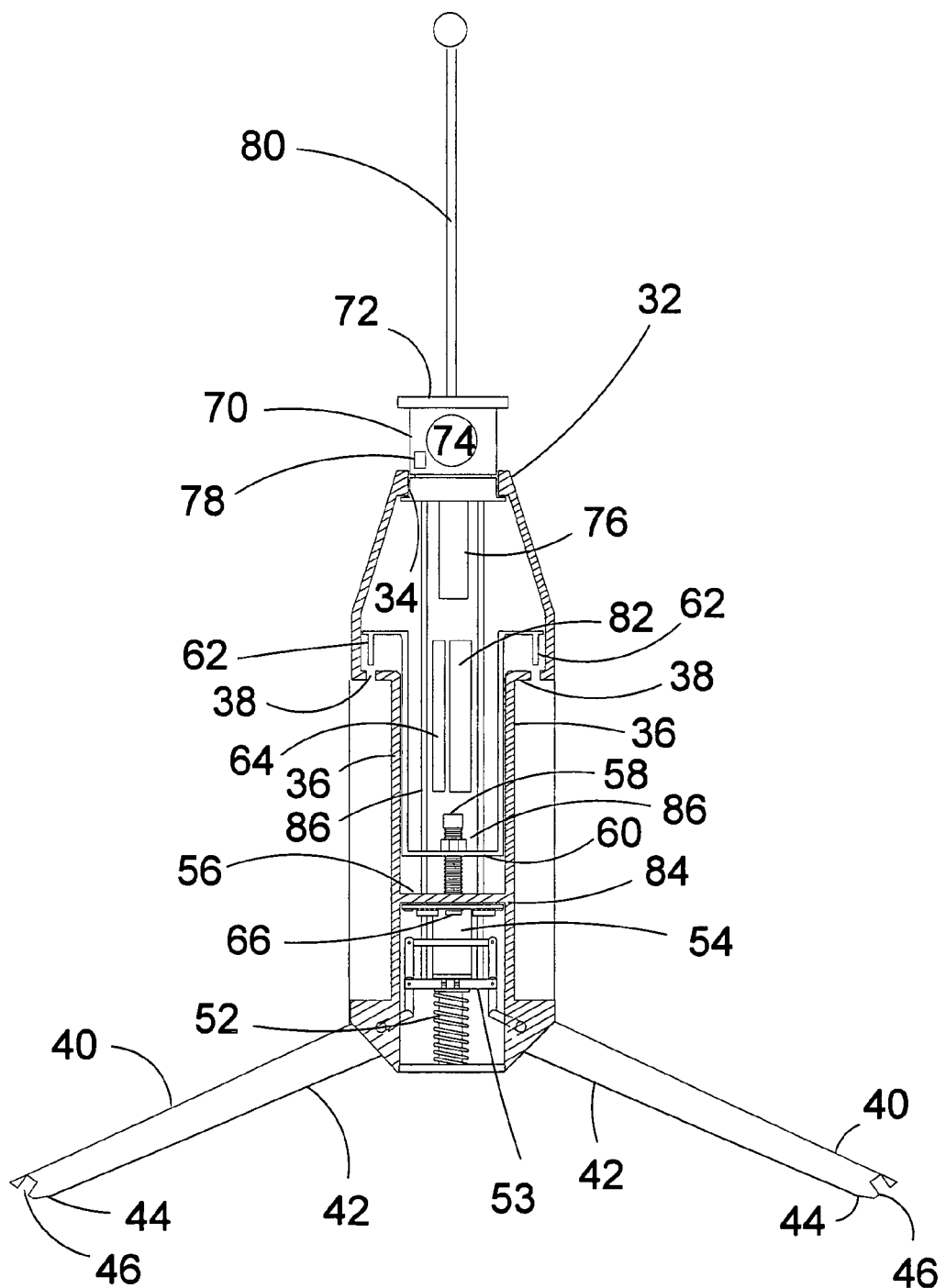

FIG. 12 is a sectional view of the present invention showing the internal components and housing in a deployed state. The four legs are down and the camera is deployed.

Figure 13:
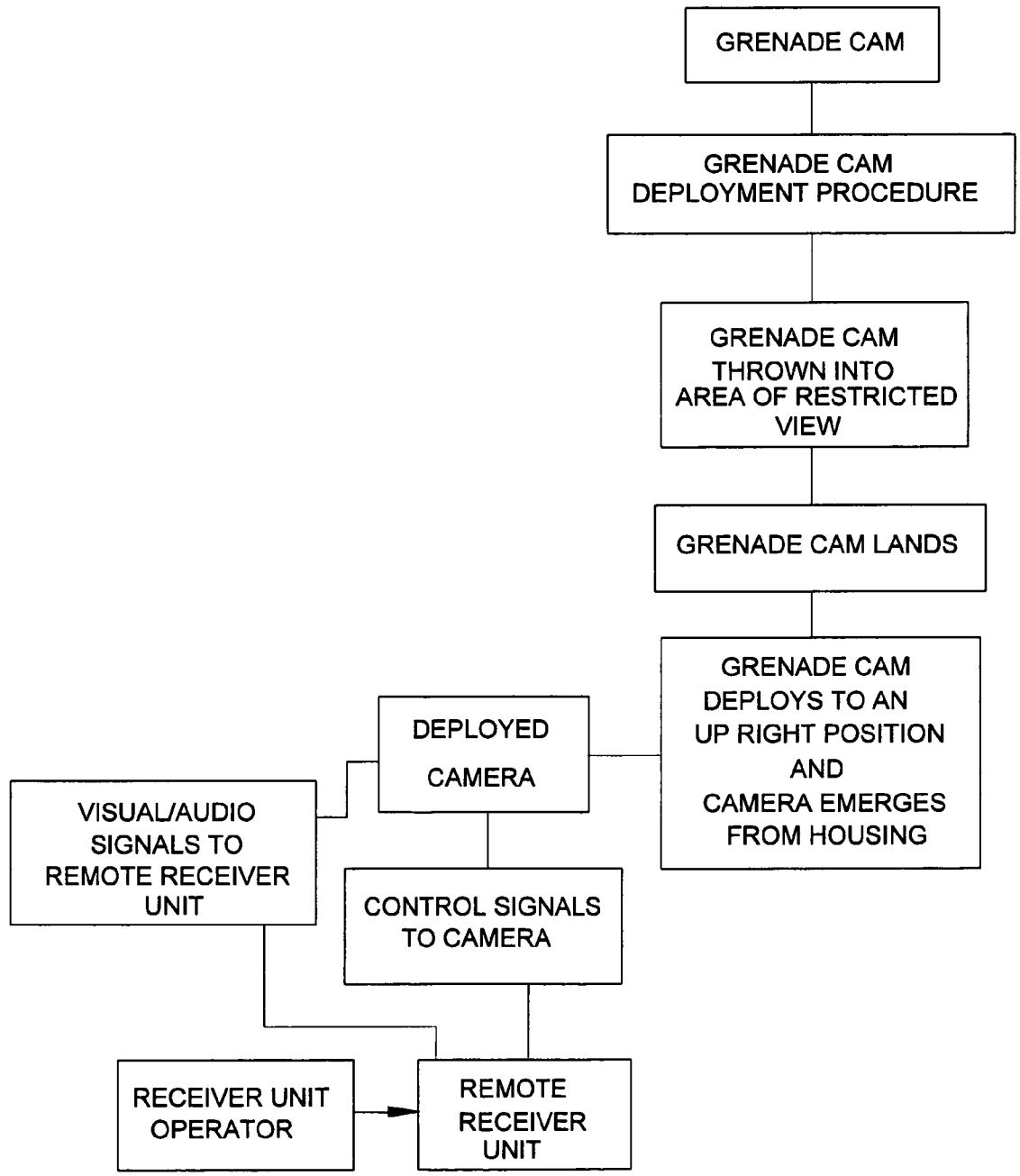

FIG. 13 is a flow chart of operation procedures showing the step by step sequence of manual deployment and use of the instant invention.

Figure 14:
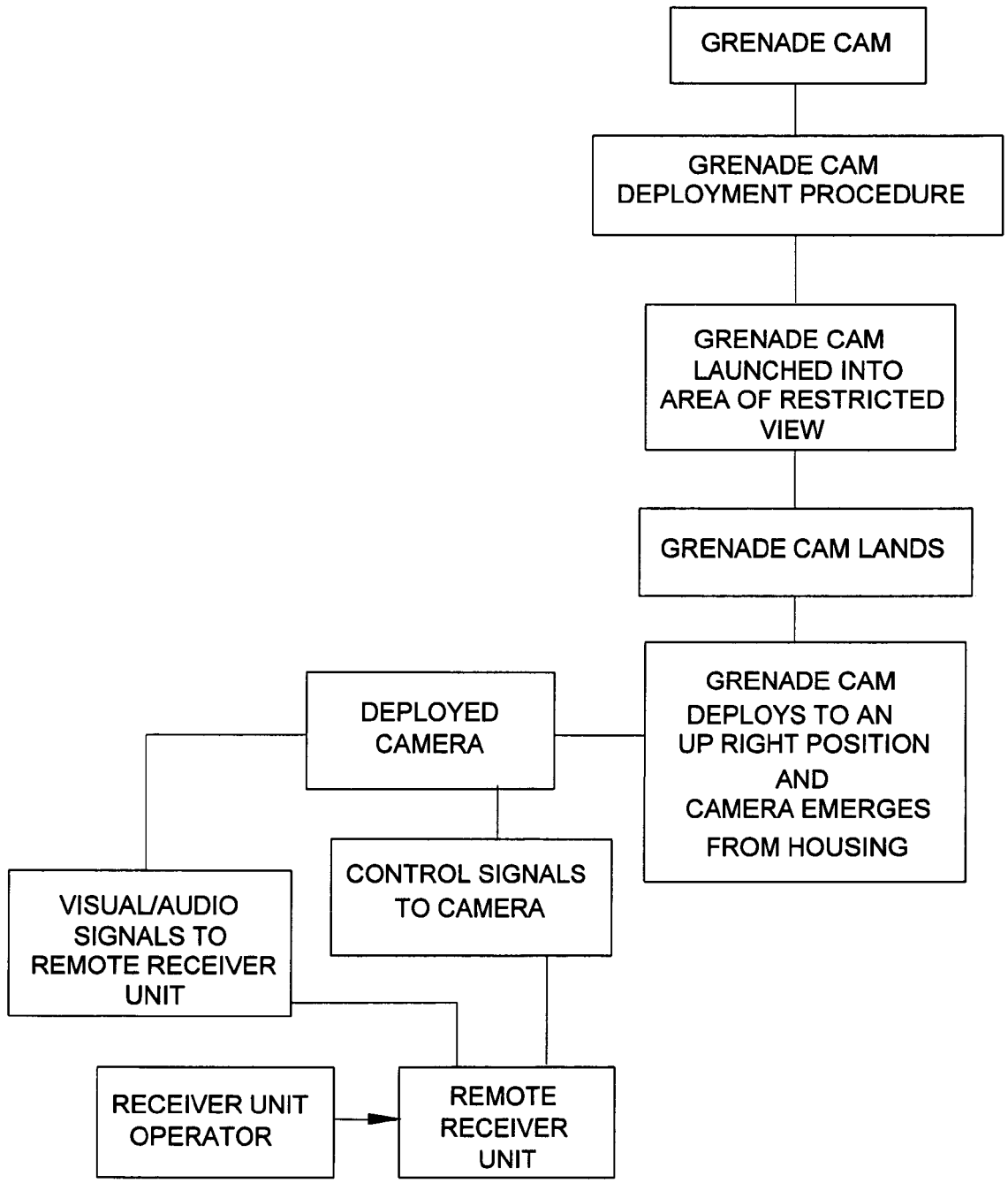

FIG. 14 is a flow chart of operation procedures showing the step by step sequence of the grenade launching deployment and use of the present invention.

DESCRIPTION OF THE REFERENCED NUMERALS

Turing now descriptively to the drawings, in which similar reference characters denote similar elements throughout the several views, the Figures illustrate the Grenade Cam of the present invention. With regard to the reference numerals used, the following numbering is used throughout the various drawing figures.

10 Grenade Cam of the present invention
12 remote receiving unit
14 individual throwing the device
16 grenade launcher
18 concealed individuals
20 concealed objects
22 concealed terrain
24 concealing building structure
26 concealing terrain
30 primary housing
32 primary housing top end
34 primary housing top end opening
36 primary housing recesses
38 four primary housing holes
40 leg
42 leg first end
44 leg second end
46 leg second end notch
48 link extension
50 link member
52 spring
53 spring top portion
54 motor
56 housing partition
58 threaded worm drive
60 lift member
62 lift member pin
64 battery 66 timer
70 camera housing
72 camera housing top portion
74 camera housing transparent wall portion
76 camera housing rotation motor
78 camera tilt motor
80 antenna
82 audio/video transmitter and receiver
84 circuit board
86 vertical members

DETAILED DESCRIPTION OF THE PREFERRED EMBODIMENT

Turning now descriptively to the drawings, in which similar reference characters denote similar elements throughout the several views, FIGS. 1–14 illustrate the Grenade Cam of the present invention indicated generally by the numeral 10.

The device 10 is shown in use in FIGS. 1–8, and in isolation in FIGS. 9–12. The device 10 includes a remote receiving unit 12 for transmitting, receiving and utilizing the audio and visual signals to and from the deployed device 10.

Deployment is be accomplished by an individual 14 throwing the device 10, or launching the device 10 using a grenade launcher 16 or similar mechanisms. The device 10 can be placed to provide a view of persons 18, objects 20, or terrain 22, otherwise concealed by building structures 24 or other terrain 26, such as a hill.

As shown in FIGS. 9–12, the device 10 has a primary housing 30, which can be made from ABS, steel, or other materials of similar strength. The primary housing 30 has a top end 32 and a top end opening 34. Primary housing recesses 36 are provided, the primary housing 30 having four downwardly facing holes 38, such holes being proximate the primary housing recesses 36.

Four legs 40 are hinged to the primary housing 30, and can be stowed in the primary housing recesses 36. In other embodiments (not shown), at least three or more legs 40 are provided. Each leg 40 has a first end 42 and a second end 44, the second ends 44 also having a notch 46. The notches 46 can be of various shapes, including open sided, hole-shaped, and other configurations all in accordance with the present invention, and as determined by the intended end use for the overall device, as will occur to those of skill in the art upon review of the present disclosure.

Each leg 40 has a link extension 48 extending from the leg's first end 42. This link extension 48 is hinged to the primary housing 30 and extends into the primary housing 30. In the primary housing 30 interior the link extension 48 is connected to a link member 50, which is in turn connected to a load member, in this embodiment, a spring 52. The link member 50 is connected to the spring 52 proximate the spring top portion 53, such that the link member 50 pushes the link extension 48 in a generally downward direction as the spring 52 is compressed, and in a generally upward direction as the spring 52 is decompressed. The spring 52 is compressed by moving the legs 40 into the recesses 36. When the spring 52 decompresses, the legs 40 are forced to extend away from the primary housing 30.

A motor 54 is positioned on a partition 56 in the primary housing 30. The motor 54 turns a threaded worm drive 58, which passes through the partition 56, and is threadably coupled with a lift member 60 such that rotation of the worm drive 58 causes the lift member 60 to move in an upward direction. The lift member 60 has four pins 62 that are positioned to protrude through the four primary housing holes 38 and mate with the leg second end notches 46 when the legs 40 are in the stowed position. When so mated the legs 40 are held in place and the spring 52 is retained in a compressed position.

The motor 54 in this embodiment is powered by a battery 64 and activated and deactivated by a timer 66, the timer 66 being preset to allow sufficient time for the thrown or launched device 10 to reach the remote surface area. When activated the motor 54 turns the worm drive 58 which causes the lift member 60 to be elevated and the lift member pins 62 to disengage from the leg second end holes 46. This releases the legs 40 and allows the spring 52 to decompress. The compressed spring 52 and decompressed spring 52 are depicted in FIG. 10 and FIG. 12, respectively.

In another embodiment, the motor 54 is activated and deactivated by remote control.

As the legs 40 are released, two legs 40 will encounter the surrounding surface. The spring 52 continues to force the legs 40 to move away from the primary housing 30, which will force the primary housing 30 into an upright position, the primary housing 30 eventually being supported by all four legs 30.

A camera housing 70 is positioned within the primary housing 30 and is configured to accept a number of available miniature viewing devices, such as video cameras and related remote control hardware. The camera housing 70 is movable between a lower and upper position, these positions being shown in FIG. 10 and FIG. 12.

In its lower position, the camera housing 70 is fully contained within the primary housing 30, and a camera housing top portion 72 seals the primary housing top end opening 34. In its upper position, the camera housing 70 protrudes through the primary housing top end opening 34, positioning the camera to view the surrounding vicinity through a transparent wall portion 74 of the camera housing 70.

The camera housing 70 is rotated by a remotely controlled rotation motor 76 to provide a panoramic view for the camera. A remotely controlled tilt motor 78 is also provided which tilts the camera within the camera housing 70. Both the rotation motor 76 and the tilt motor 78 are activated in response to signals from the remote receiving unit 12.

A flexible antenna 80 is provided which protrudes through the primary housing top end opening 34.

In this embodiment, an audio and visual transmitter and receiver 82 is positioned within the primary housing 30. A circuit board 84 is also provided, the transmitter and receiver 82 and circuit board 84 being representatively depicted in FIG. 10 and FIG. 12.

Vertical members 86 extend between the spring 52 and the camera housing 70 such that the camera housing 70 is moved in an upward direction as the spring 52 decompresses. Similarly, when the legs 40 are stowed and pinned, the movement of the spring 52 into compression pulls the camera housing 70 back into the primary housing 30, and the primary housing top portion 32 seals the primary housing top end opening 34.

In another embodiment (not shown), the housing has a transparent top portion, such that the camera may be positioned within the housing for viewing, without protruding from the housing. In still other embodiments the camera housing is substantially transparent.

In another embodiment (not shown), the spring 52 is reverse mounted such that the spring 52 is in tension when loaded. In this case the motion of the spring as the tension is released causes the leg securing member to be elevated.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A device for placing and operating a remotely controllable video camera, on a remote surface, comprising:
    (a) a primary housing, the primary housing having a top end, the top end having an opening;
    (b) a compression member positioned within the primary housing;
    (c) at least three legs, each leg being connected to the primary housing, each leg further being movable between a first position, substantially adjacent the primary housing, and a second position, extending from the primary housing, such movement being in response to movement of the compression member;
    (d) a leg securing member, the leg securing member being movable between a first position and a second position in response to motion of the compression member, the leg securing member securing at least one leg in the leg first position when the leg securing member is in the first position, the compression member being retained by such securement in the compressed position, the leg securing member further releasing the at least one leg when the leg securing member is in the second position, the compression member being released to decompress when the at least one leg is released, the decompression causing the legs to move into the legs' second positions, such that the legs support the primary housing in a position which is generally upright;
    (e) a camera housing for securing and positioning the camera, the camera housing being at least partially transparent for the camera view;
    (f) a camera housing positioning member, the camera housing positioning member causing the camera housing to lower through the primary housing top end opening as the compression member is compressed, and to elevate through the primary housing top end opening when the compression member decompresses, such elevation positioning the camera housing such that the camera view substantially clears the primary housing;
    (g) a motor for moving the leg securing member from the first to the second position; and
    (h) means for activating and deactivating the motor, such that, after the device has been propelled on to the remote surface, the motor is activated, causing the leg securing member to move to the second position, which in turn causes the compression member to decompress, the decompression causing the legs to move to the second position, such leg motion lifting the primary housing until it is supported by all the legs, the decompression also elevating the camera housing through the primary housing top opening, such that the camera can be operated remotely to provide a view of the remote surface vicinity.

2. The device of claim 1, wherein the means for activating and deactivating the motor is a timer, the timer activating and deactivating the motor at predetermined times.

3. The device of claim 1, wherein the means for activating and deactivating the motor comprises the motor, the motor being adapted for remote control.

4. The device of claim 1, wherein the leg securing member further comprises at least one pin, at least one leg further comprises a notch, and the primary housing further comprises a hole, the pin, notch and hole being aligned such that the pin protrudes through the hole and mates with the notch when the leg securing member is in its first position, such mating causing the leg to be secured adjacent the primary housing, and further such that the movement of the leg securing member to its second position caused the pin to retract through the primary housing hole, such retraction releasing the leg.

5. The device of claim 4, wherein the number of leg securing member pins, primary housing holes, and leg notches corresponds to the number of legs such that each leg is secured.

6. The device of claim 1, wherein the motor is an electric motor.

7. The device of claim 6, wherein the motor is adapted to receive battery power.

8. The device of claim 1, wherein the compression member is a spring.

9. The device of claim 1, wherein the leg securing member secures all the legs.

10. The device of claim 1, wherein the primary housing further comprises at least three recesses, each recess aligned with one of the legs, such that each leg is drawn into a recess as each leg is moved adjacent the primary housing.

11. The device of claim 10, wherein the primary housing recesses are sized such that the body of each of the legs is substantially encompassed by the recess.

12. The device of claim 1, wherein the number of legs is three.

13. The device of claim 1, wherein the number of legs is four.

14. The device of claim 1, wherein the device is hand thrown to the remote surface.

15. The device of claim 1, wherein the device is launched to the remote surface.

16. The device of claim 1, further comprising a visual signal transmitter positioned within the primary housing for providing a visual signal to a remote receiver.

17. The device of claim 1, further comprising an audio and visual signal transmitter positioned within the primary housing for providing audio and visual signals to a remote receiver.

18. The device of claim 1, further comprising a circuit board positioned within the primary housing, the circuit board providing electronic cooperation between the camera and a remote transmitting and receiving unit, such that the camera is remotely controlled as to rotation, tilt, on, off, focus and exposure.

19. The device of claim 1, wherein the camera housing further comprises a top member, the top member being adapted to substantially seal the primary housing top end opening when the legs are in the first position.

20. The device of claim 19, wherein the camera has an antenna and the camera housing top member further comprises a hole, the hole providing passage for the camera antenna from the camera housing through the camera housing top end.

21. The device of claim 1, further comprising:
   (a) a worm drive, the worm drive being in rotation communication with the motor such that the activated motor causes rotation of the worm drive; and
   (b) the leg securing member, the leg securing member further comprising a hole, the worm drive being threaded within the hole such that the rotating worm drive causes the leg securing member to move to the second position.

22. The device of claim 1, further comprising a remotely controlled rotation motor, the rotation motor being positioned within the primary housing such that when activated, the camera housing is rotated.

23. The device of claim 1, further comprising a remotely controlled tilt motor, the tilt motor being positioned on the camera housing such that when activated, the camera is tilted within the camera housing.

24. The device of claim 1, further comprising at least three link members, at least one link member for each leg, the link members linking motion of the legs to motion of the compression member.

25. The device of claim 1, further comprising:
   (a) the legs, each leg having a first and second end, each leg's first end having a substantially perpendicular link extension, each leg's first end being hinged to the primary housing proximate the joinder of the leg to the extension member;
   (b) the compression member, the compression member further having a top portion; and
   (c) a link member for each link extension, the link member connecting each link extension to the compression member top portion, such that the link extension is pulled upward as the compression member compresses.

26. A device for acquiring a view of the vicinity of a remote surface, comprising:
   (a) a primary housing, the primary housing having a top end, the top end having an opening;
   (b) a compression member positioned within the primary housing;
   (c) at least three legs, each leg being connected to the primary housing, each leg further being movable between a first position, substantially adjacent the primary housing, and a second position, extending from the primary housing, such movement being in response to movement of the compression member;
   (d) a leg securing member, the leg securing member being movable between a first position and a second position in response to motion of the compression member, the leg securing member securing at least one leg in the leg first position when the leg securing member is in the first position, the compression member being retained by such securement in the compressed position, the leg securing member further releasing the at least one leg when the leg securing member is in the second position, the compression member being released to decompress when the at least one leg is released, the decompression causing the legs to move into the legs' second positions, such that the legs support the primary housing in a position which is generally upright;
   (e) a remotely controllable camera;
   (f) a camera positioning member, the camera positioning member causing the camera to lower through the primary housing top end opening as the compression member is compressed, and to elevate through the primary housing top end opening when the compression member decompresses, such elevation positioning the camera such that the camera view substantially clears the primary housing;
   (g) a motor for moving the leg securing member from the first to the second position;
   (h) means for activating and deactivating the motor, such that, after the device has been propelled on to the remote surface, the motor is activated, causing the leg securing member to move to the second position, which in turn causes the compression member to decompress, the decompression causing the legs to move to the second position, such leg motion righting the primary housing, the decompression also elevating the camera through the primary housing top opening, such that the camera can be operated remotely to provide a view of the remote surface vicinity.

27. The device of claim 26, wherein the viewing device is a video camera.

28. A device for placing and operating a remotely controllable video camera, on a remote surface, comprising:
   (a) a primary housing, the primary housing having a top portion, the top portion being substantially transparent;
   (b) a compression member positioned within the primary housing;
   (c) at least three legs, each leg being connected to the primary housing, each leg further being movable between a first position, substantially adjacent the primary housing, and a second position, extending from the primary housing, such movement being in response to movement of the compression member;
   (d) a leg securing member, the leg securing member being movable between a first position and a second position in response to motion of the compression member, the leg securing member securing at least one leg in the leg first position when the leg securing member is in the first position, the compression member being retained by such securement in the compressed position, the leg securing member further releasing the at least one leg when the leg securing member is in the second position, the compression member being released to decompress when the at least one leg is released, the decompression causing the legs to move into the legs' second positions, such that the legs support the primary housing in a position which is generally upright;
   (e) a camera positioning member, the camera positioning member positioning the camera such that the camera view is through the primary housing top portion;
   (f) a motor for moving the leg securing member from the first to the second position;
   (g) means for activating and deactivating the motor, such that, after the device has been propelled on to the remote surface, the motor is activated, causing the leg securing member to move to the second position, which in turn causes the compression member to decompress, the decompression causing the legs to move to the second position, such leg motion righting the primary housing, such that the camera can be operated remotely to provide a view of the remote surface vicinity through the primary housing top portion.

29. A device for placing and operating a remotely controllable viewing device, on a remote surface, comprising:
   (a) a primary housing, the primary housing having a top end, the top end having an opening;
   (b) a load member positioned within the primary housing;

(c) at least three legs, each leg being connected to the primary housing, each leg further being movable between a first position, substantially adjacent the primary housing, and a second position, extending from the primary housing, such movement being in response to movement of the load member;

(d) a leg securing member, the leg securing member being movable between a first position and a second position in response to motion of the load member, the leg securing member securing at least one leg in the leg first position when the leg securing member is in the first position, the load member being retained by such securement in the loaded position, the leg securing member further releasing the at least one leg when the leg securing member is in the second position, the load member being released to unload when the at least one leg is released, the unloading causing the legs to move into the legs' second positions, such that the legs support the primary housing in a position which is generally upright;

(e) a viewing device housing for securing and positioning the viewing device, the viewing device housing being at least partially transparent for the viewing device view;

(f) a viewing device housing positioning member, the viewing device housing positioning member causing the viewing device housing to lower through the primary housing top end opening as the compression member is compressed, and to elevate through the primary housing top end opening when the load member unloads, such elevation positioning the viewing device housing such that the viewing device view substantially clears the primary housing;

(g) a motor for moving the leg securing member from the first to the second position; and (h) means for activating and deactivating the motor, such that, after the device has been propelled on to the remote surface, the motor is activated, causing the leg securing member to move to the second position, which in turn causes the load member to unload, the unloading causing the legs to move to the second position, such leg motion lifting the primary housing until it is supported by all the legs, the unloading also elevating the viewing device housing through the primary housing top opening, such that the viewing device can be operated remotely to provide a view of the remote surface vicinity.

30. The device of claim 29, further comprising a remote transmitting and receiving unit for receiving visual signals from the propelled device and transmitting signals to operate the viewing device.

31. The device of claim 30, wherein the remote transmitting and receiving unit also receives audio signals.

32. A device for placing and operating a remotely controllable video camera, on a remote surface, comprising:

(a) a primary housing, the primary housing having a top end, the top end having an opening;

(b) a compression member positioned within the primary housing;

(c) four legs, each leg being connected to the primary housing, each leg further being movable between a first position, substantially adjacent the primary housing, and a second position, extending from the primary housing, such movement being in response to movement of the compression member;

(d) a leg securing member, the leg securing member being movable between a first position and a second position in response to motion of the compression member, the leg securing member securing each leg in the leg first position when the leg securing member is in the first position, the compression member being retained by such securement in the compressed position, the leg securing member further releasing the legs when the leg securing member is in the second position, the compression member being released to decompress when the legs are released, the decompression causing the legs to move into the legs' second positions, such that the legs support the primary housing in a position which is generally upright;

(e) a camera housing for securing and positioning the camera, the camera housing having a transparent portion;

(f) a camera housing positioning member, the camera housing positioning member causing the camera housing to lower through the primary housing top end opening as the compression member is compressed, and to elevate through the primary housing top end opening when the compression member decompresses, such elevation positioning the camera housing such that the camera view substantially clears the primary housing;

(g) a motor for moving the leg securing member from the first to the second position;

(h) a timer for activating and deactivating the motor, such that, after the device has been propelled on to the remote surface, the motor is activated, causing the leg securing member to move to the second position, which in turn causes the compression member to decompress, the decompression causing the legs to move to the second position, such leg motion lifting the primary housing until it is supported by all the legs, the decompression also elevating the camera housing through the primary housing top opening, such that the camera can be operated remotely to provide a view of the remote surface vicinity;

(i) a remotely controlled rotation motor, the rotation motor being positioned within the primary housing such that when activated, the camera is housing is rotated; and (j) a remotely controlled tilt motor, the tilt motor being positioned on the camera housing such that when activated, the camera is tilted within the camera housing.

\* \* \* \* \*